Patented May 4, 1954

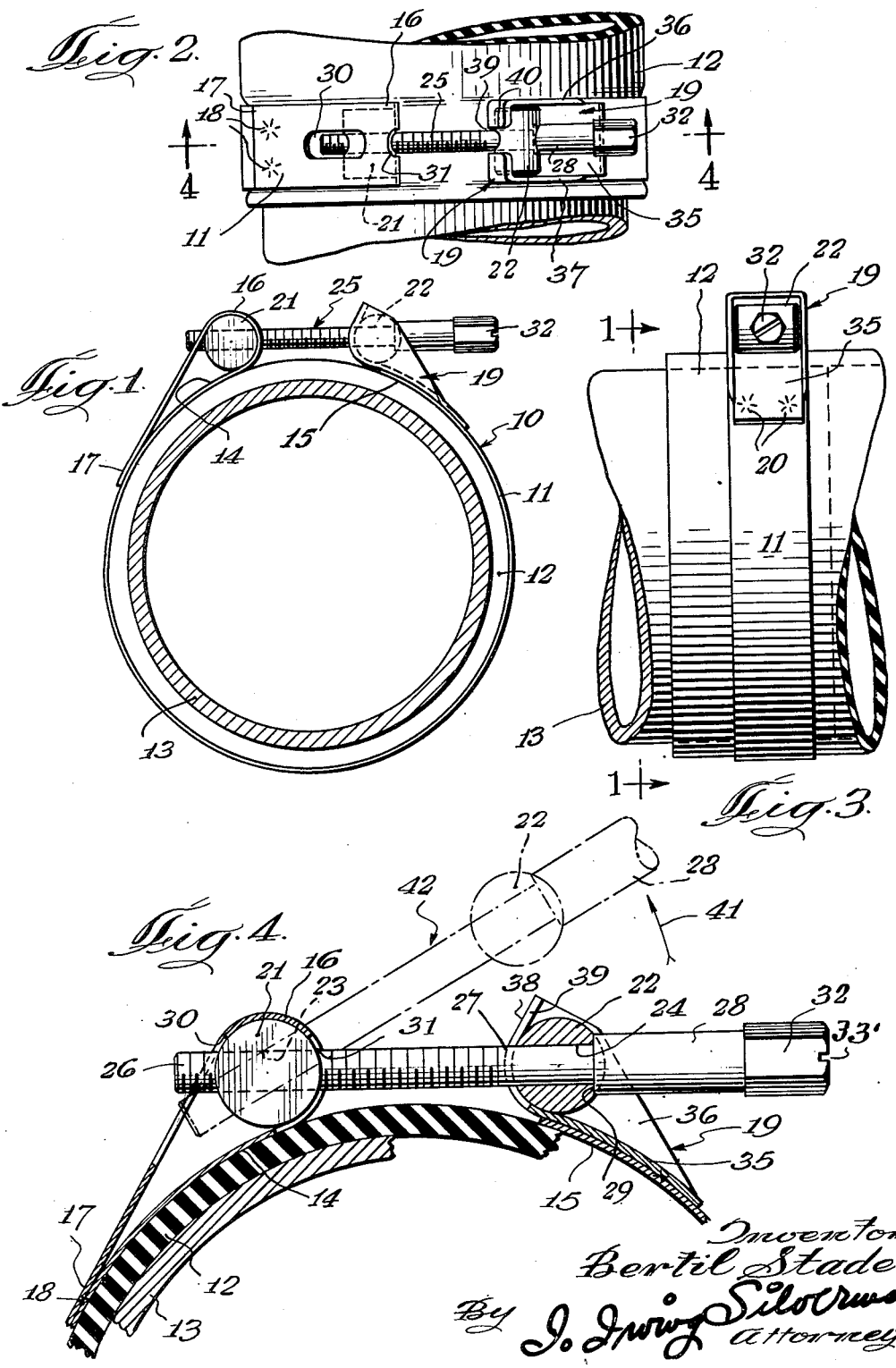

2,677,164

UNITED STATES PATENT OFFICE 2,677,164

RAPID RELEASE HOSE CLAMP

Bertil Stade, Elmwood Park, Ill., assignor to Wittek Manufacturing Co., Chicago, Ill., a corporation of Illinois Application September 20, 1951, Serial No. 247,399

3 Claims. (Cl. 24—279)

1

This invention is concerned with improvements in clamping devices for coupling hoses in telescopic relation to conduits or pipes and is more particularly concerned with the provision of such a clamping device having novel means permitting rapid and efficient release thereof for replacing the clamp hose or conduit.

Clamps of the type herewith concerned ordinarily are provided with a flexible clamp band and adjustable tightening means adapting same to be clamped about a hose connection. In order to be practical, the clamp must engage around the hose connection very tightly so as to prevent leakage therethrough and to maintain the hose tightly on the pipe or conduit under operating conditions. As may often be the case, conditions arise which require replacement of either the clamp, the hose or the pipe and as will be understood, this must be done rapidly and efficiently so that operation of the line may be continued.

The type of clamp with which we are here concerned is likewise suitable for use as means for coupling the ends of hoses, conduits or the like together in tight connection.

Heretofore, said tightening means were known to consist of a pair of connectors each carried in the looped ends of the clamp band and a threaded screw spanned between the connectors so that tightening of the screw would draw the connectors toward each other, drawing along therewith the looped ends whereby to tighten the clamp band on the hose connection. Such a construction is disclosed in Patent No. 2,341,828 for a Clamp. The said connectors were intended to remain relatively fixed in said looped ends so that to release the clamp, it was required to withdraw the tightening screw a considerable amount before release of the clamp could be accomplished. Furthermore, because the tightening means were not intended to be removable except by complete removal of the tightening screw from the connectors, it was most difficult, if not impossible, to spread the clamp proper away from the hose connection until the tightening screw was completely removed from its engagement with the connectors. The attendant disadvantage of this construction was the inability to effect a rapid and safe release of the clamp so as to permit replacement of either the clamp, hose or conduit. Also, it was not uncommon for the relatively small parts such as the connectors and tightening screw to be lost once the clamp was removed from the tube coupling.

Accordingly, a primary object of the invention is to provide a clamp of the character described adapted substantially to eliminate the above mentioned disadvantages in the release thereof.

Another important object of the invention is to provide novel and unique tightening means in a clamp of the character described which is particularly adapted to permit rapid, safe and efficient release of said clamp.

Another object of the invention is to provide an improved clamp of the character described having a novel fitting thereon which permits the tightening means to be pivoted out of engagement with the clamp so that the clamp may easily and rapidly be spread away from the hose connection for releasing same.

Another object of the invention is to provide a rapid release clamp of the character described which is efficient in the rapid tightening or release thereof on a hose connection; which is simple and economical to make and the release of which may be accomplished without the complete disassembly of said tightening means so that the probability of losing parts thereof is eliminated.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a sectional view through a hose connection having the clamp embodying the invention mounted thereon, same being taken along the line 1—1 of Fig. 3 and in the indicated direction.

Fig. 2 is a top plan view of the clamp.

Fig. 3 is an end-on view of the clamp.

Fig. 4 is a sectional view taken through the clamp along the line 4—4 of Fig. 2 and in the indicated direction.

Referring now to the drawings, the reference character 10 designates generally the hose clamp embodying the invention. Same comprises a flexible metallic strip which constitutes the circular clamp band 11. The band 11 is adapted to be mounted around a hose 12 fitted onto the end of a pipe or conduit 13. The band 11 is split at one point along its circumference to provide end portions 14 and 15. One end portion 14 is bent back over itself to form a loop 16 and the end 17 thereof is secured to the band by means such as spot welds shown at 18. The second end 15 has a fitting 19 secured thereto as at 20 by spot welding designed to permit the rapid release of the said clamp as hereinafter will be described in greater detail.

The loop 16 and the fitting 19 are designed to retain the connector members 21 and 22 which are cylindrical in formation and are provided respectively with passageways 23 and 24. The passageways are arranged perpendicular to the cylindrical axis of said members. The passageway 23 is threaded while the opening 24 is unthreaded. A tightening screw 25 or screw bolt is spanned between the connectors 21, 22, the threaded end 26 of said screw being received in the threaded passageway 23 while the shank portion 27 is received in the passageway 24. Member 22 is slidable on shank portion 27. The shank portion 27 is slightly greater in diameter than the shank portion 28 so as to provide a shoulder 29 adapted to abut the side of the connector member 22 when the screw is tightened.

The loop 16 is provided with a pair of transversely aligned slots 30 and 31 aligned with opening 23 and through which the end 26 may extend upon tightening of the screw 25. The head 32 of the screw bolt 25 is preferably of hexagonal cross-section to permit same to be engaged by a suitable wrench for rapid and efficient tightening or loosening of same, said head 32 being disposed exterior of the fitting 19. The head 32 may also have a slot 33″ to permit rotation thereof by a screw driver. Tightening of the screw bolt 25 will draw the connectors 21 and 22 toward each other thereby closing the distance between the end portions 14 and 15 and clamping the band 11 tightly about the hose 12.

The fitting 19 mounted on the end 15 of said band 11 permits the rapid release of the clamp 10 with the advantages above described. The same comprises an integral member preferably made from metal secured atop the clamp band 11. There is a planar portion forming the bottom wall 35, the side edges of which are extended perpendicular thereto to form a pair of spaced, vertically disposed side walls 36 and 37. The side walls 36 and 37 are joined by means of a front wall 38 integrally formed therewith an extending vertically from the wall 35. The walls 36 and 37 are spaced apart a distance sufficient to receive therein the connector member 22. The front wall 38 is provided with a transverse groove 39 open at its top 40 which is adapted to receive therethrough the shank portion 27 so that with the connector 22 disposed between the walls 36 and 37, the hole 24 in said connector is aligned with said groove 39. The rear of the fitting 17 is open to permit passage therethrough of the shank portion 28 and the head 32. The construction constitutes said fitting, in effect a dish shaped socket member.

The operation of the means for tightening of the clamp 10 is simple and effective. By tightening the screw 25, the connectors 21 and 22 are drawn toward each other, biasing the member 21 against the loop 16 and the connector 22 against the front wall 38 whereby to close the distance between the said loop and fitting. To release the clamp, the screw 25 is rotated in a direction to withdraw the end 26 from the connector 21. The flexibility of the clamp band 11 upon such release will cause the end portions 14 and 15 also to spread apart somewhat. The operator then merely grasps the loop 16 and fitting 17 and manually compresses them together shortening the distance between them. This is possible since the shank portion 27 is slidable horizontally in the opening 24 of the connector 22. With the loop 16 and 17 in this position, the operator merely moves the screw 25 upward in the direction of the arrow shown at 41, whereby to cause the screw to pivot about the horizontal axis of the connector 21 which operates as a trunnion nut. The slot 31 is long enough to permit such limited pivotal movement of the shank portion 27. The screw 25 may then be pivoted up to the position shown in phantom lines at 42 whereby the connector 22 is removed from the fitting 17. The clamp band 11 may then be spread manually with ease and rapidity due to its flexible nature.

It will be noted that with the tightening screw released as shown at 42, the component parts of the tightening means still remain in assembled condition. Thus, the threaded end 26 is still engaged in the trunnion nut 21 and the connector 22 is still mounted on the shank portion 27. There is no probability of the said component parts being lost as is probable in prior devices herein described. To reassemble the clamp, the ends 14 and 15 are drawn toward each other manually and the screw 25 pivoted downwardly to dispose the connector member 22 between the side walls 36 and 37 and against the front wall 38 of the fitting and the shank portion 27 in the groove 39. The provision of the fitting 17 on the end 14 of the band 11 thereby permits the screw 25 to be pivoted in and out of the groove 39 for the rapid release and assembly of the clamp 10 with a minimum of time and effort.

It is believed that this invention, its mode of construction and assembly, and many of its advantages should be readily understood from the foregoing with no further description, and it should also be manifest that while a preferred embodiment of the invention has been shown and described for illustrative purposes, the specific details are nevertheless capable of wide variation within the purview of the invention as defined in appended claims.

I claim:

1. A rapid-release clamp comprising a circular band of flexible metal having a pair of free end portions, a self-loop formed on one end portion thereof and having a cylindrical nut loosely disposed in the loop and there being slots on opposite sides of the loop, a tightening screw threadedly engaged in the nut extending through the slots and transversely of the axis of the cylinder forming the nut, a pre-formed rigid member secured to the second end portion having a bottom wall, upstanding side walls and a front wall of generally curved formation and provided with an open ended slot, the bottom wall being in face to face securement with said second end portion, said screw having its threaded body freely passing through said open ended slot and being provided with a head for driving the screw and a shoulder spaced from the head, of a diameter greater than the threaded body of the screw, a cylindrical connector member having a bore therethrough at right angle to its axis and the threaded body of the screw being loosely slidable in the bore but the bore being of lesser diameter than that of said shoulder, the said walls of said preformed member seating said connector member with a curved side engaged against the front wall on the interior of the preformed member such that tightening of the screw draws said end portions together while permitting rapid removal and replacement of said connector member into said preformed member in pivoting said screw about the nut axis, said head being substantially spaced from said connector member to be manipulable at all times.

2. A rapid-release clamp as described in claim 1 in which the connector member has an annular seat at one end of the bore to serve as a thrust bearing for said screw and engaging said shoulder.

3. A rapid-release clamp as described in claim 1 in which the screw has an unthreaded portion between the threaded body and the shoulder of a diameter less than the bore, serving as a journal for said connector member.

References Cited in the file of this patent

UNITED STATES PATENTS

| Number | Name | Date |
|---|---|---|
| 830,110 | Spencer | Sept. 4, 1906 |
| 2,363,206 | Sprouse | Nov. 21, 1944 |
| 2,601,420 | Stackhouse | June 24, 1952 |

FOREIGN PATENTS

| Number | Country | Date |
|---|---|---|
| 131,177 | Great Britain | Aug. 21, 1919 |
| 339,065 | Great Britain | Dec. 4, 1930 |
| 793,074 | France | Nov. 7, 1935 |
| 541,613 | Great Britain | Dec. 3, 1941 |
| 621,406 | Great Britain | Apr. 8, 1949 |